United States Patent [15] 3,646,393

Tarr [45] Feb. 29, 1972

[54] LINEAR SAWTOOTH SCAN GENERATOR UTILIZING NEGATIVE FEEDBACK AND MILLER INTEGRATION

[72] Inventor: William A. Tarr, Bloomington, Ind.

[73] Assignee: Sarkes Tarzian, Inc., Bloomington, Ind.

[22] Filed: Sept. 10, 1969

[21] Appl. No.: 856,650

[52] U.S. Cl. ....................315/27 TD, 315/29, 328/127
[51] Int. Cl. ....................H01j 29/70
[58] Field of Search ............315/27 LC, 29, 27 TD; 307/228; 328/127, 35

[56] References Cited

UNITED STATES PATENTS

| | | | |
|---|---|---|---|
| 2,741,723 | 4/1956 | Pacini | 315/27 |
| 3,470,495 | 9/1969 | Deboo | 307/228 X |
| 2,728,876 | 12/1955 | Varela | 315/27 |
| 2,771,517 | 11/1956 | Harrison, et al | 315/27 UX |
| 2,799,800 | 7/1957 | Starks-Field et al. | 315/27 |
| 2,984,788 | 5/1961 | Korff et al | 328/35 |
| 3,482,116 | 12/1969 | James | 328/127 X |
| 3,521,082 | 7/1970 | Wolk | 307/228 X |
| 2,661,443 | 12/1953 | Smith | 315/27 UX |

OTHER PUBLICATIONS

Millman & Taub, " Pulse, Digital, and Switching Waveforms," McGraw- Hill (1965)- pg. 304.

*Primary Examiner*—Rodney D. Bennett, Jr.
*Assistant Examiner*—J. M. Potenza
*Attorney*—Mason, Kolehmainen, Rathburn & Wyss

[57] ABSTRACT

A scan generator is provided which generates a stable, linear sawtooth current suitable for application to a magnetic deflection coil. An operational amplifier is bypassed by a capacitor so that it generates a linear ramp potential. Synchronizing pulses cause a field effect transistor to discharge the capacitor and thus convert this ramp potential into a sawtooth potential. A differential amplifier measures the difference between this sawtooth potential and the potential across a resistor connected in series with the deflection coil, and generates an output signal proportional to this difference that is applied to the coil through an output amplifier. A highly linear sawtooth scan is thus created which is stable even when subjected to varying supply potentials. The same circuit can be modified for use as a skew control circuit.

14 Claims, 2 Drawing Figures

Figure 1:
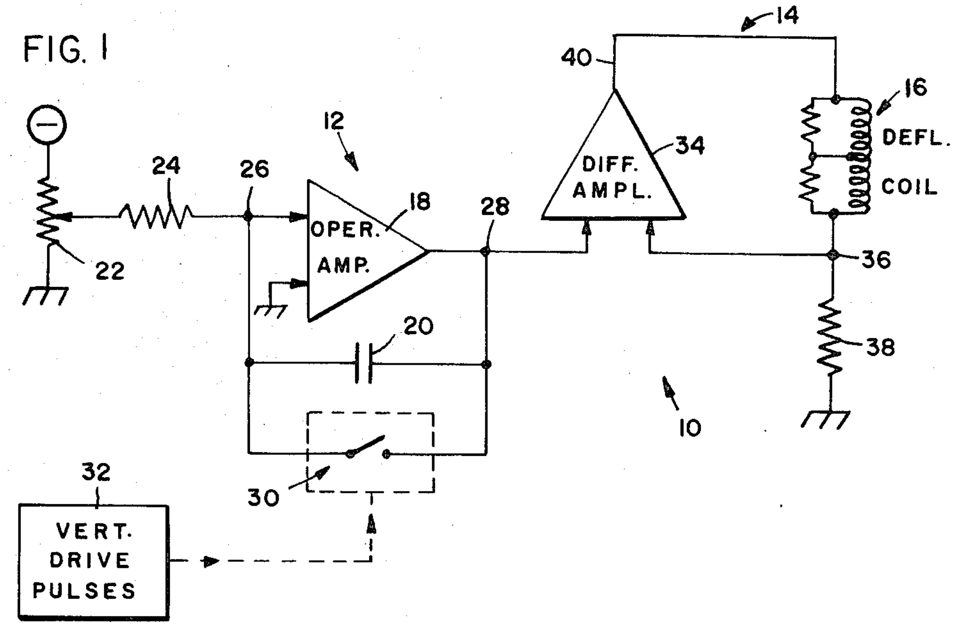

INVENTOR:
WILLIAM A. TARR,
BY:
Mason, Kolehmainen, Rathburn & Wyss
ATT'YS.

LINEAR SAWTOOTH SCAN GENERATOR UTILIZING NEGATIVE FEEDBACK AND MILLER INTEGRATION

The present invention relates to deflection circuits, and more particularly to deflection circuits for producing a sawtooth current waveform within a magnetic deflection coil.

A major problem in designing any linear magnetic deflection scanning system is that of generating a potential waveform which, when applied to a particular deflection coil, will produce within the coil a linear sawtooth current waveform. If a deflection coil were purely resistive, a sawtooth potential waveform would do the job. Similarly, if a deflection coil were purely inductive, a rectangular or trapezoidal potential waveform could be used. Unfortunately most deflection coils include both inductance, resistance and capacitance, and therefore a fairly complex potential waveform has to be generated. In the past, many different complex wave generators have been designed for use in various deflection systems, each generating a waveform suitable for use with only one particular type of size of deflection coil. Often these generators would include a distortion or linearity control which had to be properly set to give maximum linearity, and to compensate for changes in supply potentials, operating frequencies, and coil impedances.

Conventional scan generators usually have included height and centering controls which interact to some degree. Thus, when the height control is adjusted, the centering changes slightly, and vice versa. Generally, these controls have had to be located close to the scan generator, because they are subjected to high frequency signals which can be easily distorted by the capacity of long cables.

An object of the present invention is therefore to provide a simple sweep generator circuit which can generate a highly linear sawtooth current in any deflection coil, and which automatically alters its potential output waveform as needed to maintain the linearity of the sawtooth current.

A further object of the present invention is to provide such a generator that is relatively insensitive to variations in supply potential, operating frequency, or deflection coil impedance, and that does not require a manually adjustable linearity control.

Another object of the present invention is to provide height and width controls for such a generator which do not interact, and which can be remotely located away from the generator.

Yet another object is to provide a generator capable of producing a clean sawtooth waveform, one containing no spikes or irregularities at the start or finish of the sawtooth sweep.

In accordance with these and many other objects, an embodiment of the present invention comprises briefly a sweep circuit that includes a highly linear sawtooth potential waveform generator, and a voltage to current converter circuit which supplies current to a deflection coil. The converter output circuit measures the difference between the magnitude of the current in the deflection coil and the magnitude of the potential presented by the waveform generator, and adjusts the potential across the deflection coil as needed to minimize this difference and to maintain the deflection coil current proportional to the potential presented by the waveform generator. In this manner, a highly linear sawtooth current waveform is produced within the deflection coil.

The linear sawtooth potential waveform generator is an operational amplifier that is bypassed by an integrating capacitor to form a ramp potential generator. A field effect transistor discharges the integrating capacitor at the end of each sweep interval and thus converts the ramp potential into a sawtooth potential. Size is adjusted by altering the amount of direct current flowing into an inverted input of the operational amplifier. Since direct current can be transmitted over long distances, the source of this size adjusting current can be located any desired distance from the sweep circuit. A connection between the size control and a noninverted input to the operational amplifier balances out a centering component in the size adjustment current, and thus allows size and centering to be independently adjusted, without any interaction.

The voltage to current converter circuit is a differential amplifier having its output connected to one side of the deflection yoke and having a noninverting input connected to the output of the linear sawtooth potential waveform generator. The other side of the deflection yoke is connected to ground by a resistor, and is also connected to an inverting input of the differential amplifier. An externally generated direct current is fed into the differential amplifier to shift the centering of the sweep. The source of this direct current can again be any distance from the sweep generator. Since both the operational amplifier and the differential amplifier are essentially unaffected by supply potential variations, the sweep circuit is fully stable so long as the supply voltage variations do not affect the size or centering currents. If both the externally generated size and centering currents are held stable, then power supply potential fluctuations can have only a secondary effect upon the operation of the sweep circuit.

Further objects and advantages of the present invention will become apparent as the following description proceeds, and features of novelty which characterize the present invention will be pointed out with particularity in the claims annexed to and forming a part of this specification.

Figure 2:
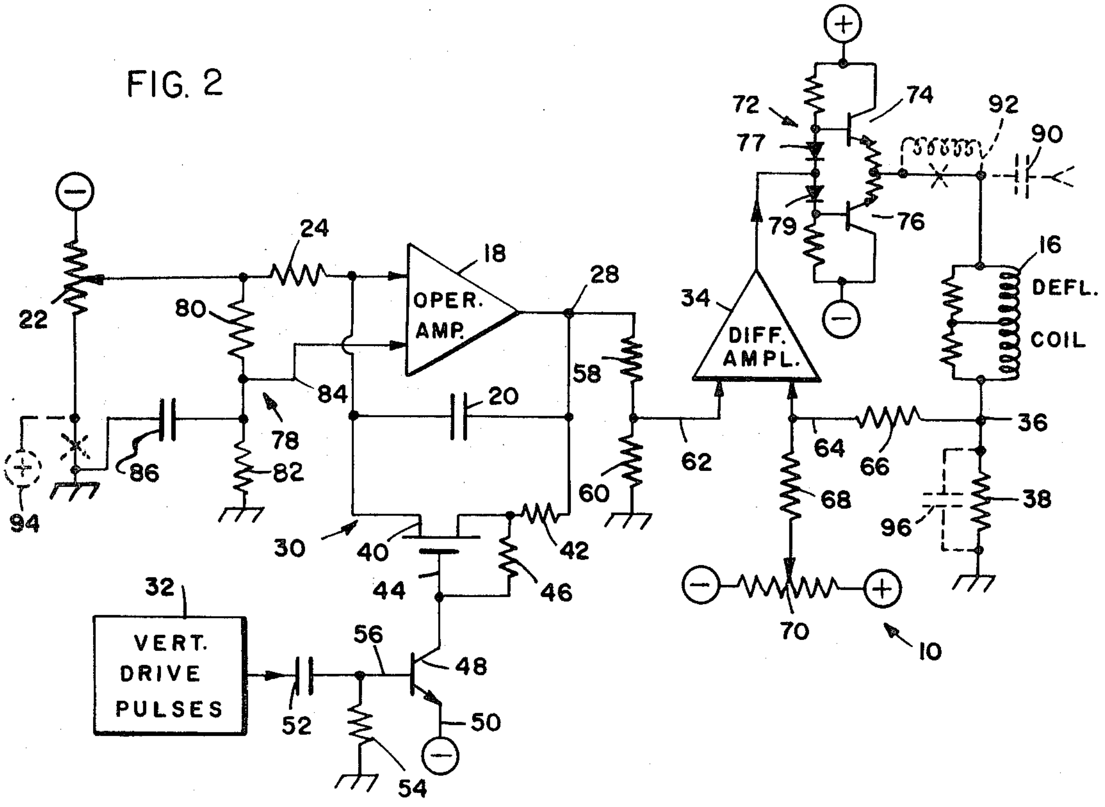

For a further understanding of the present invention, reference may be had to the drawings, wherein:

FIG. 1 is a simplified schematic diagram of a deflection circuit designed in accordance with the present invention; and FIG. 2 is a schematic diagram of a complete vertical deflection system designed in accordance with the present invention, and also showing in dashed lines those changes that would be made to adapt the system for use as a horizontal deflection skew control.

Referring now to FIG. 1, there is shown a deflection system designed in accordance with the present invention and indicated generally by the reference numeral 10. The deflection system 10 comprises basically a sawtooth potential waveform generator 12 and a voltage to current converter 14. The generator 12 produces a sawtooth voltage waveform which appears at an output node 28 of the generator 12. The voltage to current converter 14 receives the sawtooth voltage from the node 28 as an input, and generates a sawtooth current which it applies to a deflection coil 16. The generator 12 comprises basically an operational amplifier 18 bypassed by an integrating capacitor 20. An input signal flows from a size adjustment potentiometer 22 through a resistor 24 to the input 26 of the operational amplifier 18. This input signal causes a ramp voltage waveform to appear at the output node 28. A switch 30 discharges the integrating capacitor 20 each time it senses a vertical drive pulse supplied by a vertical drive pulse generator 32. This converts the ramp voltage waveform at the node 28 into a sawtooth waveform of proper frequency for use as a sweep signal. Adjustment of the potentiometer 22 adjusts the size of the waveform at the node 28 but does not effect the centering of the sawtooth waveform, for reasons which will be explained below in connection with the discussion of FIG. 2.

The voltage to current converter 14 comprises a differential amplifier 34. The amplifier 34 measures the difference between the voltage at the node 28 and the voltage at a node 36. The node 36 is connected to ground by a resistor 38 and is also connected to one end of the deflection coil 16. The output 40 of the differential amplifier 34 connects to the other end of the deflection coil 16. Current flow through the deflection coil 16 generates a voltage across the resistor 38 that is proportional to the current in the coil 16. The differential amplifier 34 subtracts this voltage from the voltage at the output node 28. If the voltages are a not equal, the amplifier 34 applies the necessary voltage to the deflection coil 16 so as to equalize these two voltages. In this manner, the precise voltage required to force a linear sawtooth current through the coil 16 is generated at the output 40, irrespective of coil impedance.

Since the amplifiers 18 and 34 have a very high gain, they function essentially in an ideal manner, and the amount of distortion in the resultant sawtooth current is negligible. Hence there is no need for a linearity control or a distortion control. The amplifiers 18 and 34 have high gain, differential inputs which render them essentially insensitive to any changes in the system supply voltage, and this renders the sweep-centering immune from shifts caused by changes in the supply potentials of the system. Size is affected only to the extent that the potential across the potentiometer 22 changes, and this potential can be easily stabilized.

FIG. 2 shows a detailed schematic diagram of a sweep generator designed in accordance with the present invention. The elements which are identical to those shown in FIG. 1 have been assigned the same reference numerals in FIG. 2. The discharge switch 30 is a field effect transistor 40 connected in series with a resistor 42. The field effect transistor 40 discharges the integrating capacitor 20 whenever a negative bias is not supplied to its gate electrode 44. The resistor 42 slows down the discharge rate of the capacitor 20 and therefore determines the flyback time of the deflection circuit. A resistor 46 connects the gate electrode 44 to the lead of the field effect transistor 40 which connects to the output 28. This resistor 46 renders the transistor 40 conductive whenever no external bias is supplied to the gate electrode 44.

A transistor 48 acts as a normally closed switch that connects the gate electrode 44 to a negative bias potential 50, and thus normally holds the field effect transistor 40 in a nonconductive state. The transistor 48 is normally kept saturated by a resistor 54 which connects the base 56 of the transistor 48 to ground and supplies a positive saturation current to the transistor 48. The transistor 48 thus normally prevents the field effect transistor 40 from discharging the integrating capacitor 20. Negative vertical drive pulses are applied to the base electrode 56 of the transistor 48 through a capacitor 52. During each of these pulses, the capacitor 52 biases the emitter 56 negatively and momentarily stops conduction of the transistor 48. The resistor 46 then biases the gate 44 positively so that the transistor 40 becomes fully conductive and discharges the capacitor 20 through the resistor 42. In this manner the integrating capacitor 20 is discharged at the end of each sweep synchronously with the occurrence of the vertical drive pulses.

The sawtooth voltage at the node 28 is not applied directly to the operational amplifier 34, but is first reduced in amplitude by a potential divider circuit comprising serially connected resistors 58 and 60 which connect the node 28 to ground. A node 62 that is common to the two resistors 58 and 60 connects to a noninverting input 62 of the differential amplifier 34. An inverting input 64 to the differential amplifier 34 is not connected directly to the node 36, as in FIG. 1, but indirectly through a resistor 66. A second resistor 68 connects the input 64 to the adjustable tap of a centering potentiometer 70 that is connected between positive and negative bias points. The resistors 66 and 68 cause the voltage appearing at the slider of the potentiometer 70 and the voltage appearing at the node 36 to be added before application to the inverted input 64. Hence, adjustment of the potentiometer 70 changes the bias of the sawtooth current within the deflection coil 16, and thus changes the sweep centering.

In order to provide a low output impedance to the deflection coil 16, a unity voltage gain driver amplifier 72 is connected between the output of the operational amplifier 34 and the deflection coil 16. This driver amplifier 72 comprises two complementary transistors 74 and 76 connected to form a class AB-power output stage. The driver amplifier 72 provides a low output impedance for the differential amplifier 34 and thus greatly improves the control which the amplifier 34 has over current in the deflection coil 16. The emitters of the complementary transistors 74 and 76 are connected by resistors to the deflection coil 16, the collectors are connected to positive and negative potentials, and the bases are connected by biasing diodes 77 and 79 to the output of the differential amplifier 34.

The circuit of FIG. 2 includes a centering component cancellation circuit 78 which allows the size potentiometer 22 to be adjusted without affecting the centering of the sweep circuit. Without the circuit 78, adjustments of the height control 22 in FIG. 1 would not only change the size of the sawtooth at the node 28, but also would shift its centering by half as much. This would be objectionable, since it means that the centering potentiometer would have to be readjusted each time the size potentiometer is adjusted, and it would also mean that any change in the voltage which affects size would also affect centering.

As shown in FIG. 2, resistors 80 and 82 are serially connected between ground and the slider of the size potentiometer 22. The voltage which appears at the node 84 common to the resistors 80 and 82 is applied to the noninverting input of the operational amplifier 18. A capacitor 86 connects the node 84 to ground for alternating current frequencies and prevents any AC signals from appearing at the node 84. Whenever the size potentiometer 22 is adjusted, a compensating voltage at the node 84 cancels out any effect which adjustment of the size would otherwise have upon centering. In case of a power supply voltage change, the same network prevents the change in voltage across the size potentiometer 22 from affecting centering. The centering potentiometer 70 is connected between positive and negative sources of supply. Since generally the positive and negative supplies drift simultaneously in opposite directions, only small changes in centering are observed if the centering potentiometer 42 is normally near its center setting.

In accordance with an important feature of the invention, the series resistor 38 is relatively large and preferably has a value equal to the resistive component of the deflection coil 16. Ordinarily the resistive component in the deflection coil circuit is purposely made as small as possible so that the R-L time constant will not affect the linearity of scan. However, in the present arrangement a large resistor 38 is used so that a large feedback signal is developed which is of approximately the same amplitude as the input signal applied to the other differential input 62. Thus, if the differential amplifier 34 has an open loop gain of 80 db., the provision of a large feedback signal equal to the input signal will produce substantially unity gain in the amplifier 34 and an extremely high degree of linearity in the deflection coil circuit which is sufficient to overcome the large R-L time constant introduced by the use of such a large feedback resistor. The use of a large feedback signal has the further beneficial effect of stabilizing the DC centering component derived from the potentiometer 70 under varying conditions of temperature and voltage drift. This latter stabilizing effect is particularly important in color camera circuits where the DC centering component must be held to a particular value within 0.1 of 1 percent under varying ambient conditions.

The sweep generator circuit of FIG. 2 may be employed as either a vertical or as a horizontal scan generator. In the case of a vertical scan generator the deflection coil 16 may have a relatively high inductance, in the order of 50 millihenries or more without introducing undesired nonlinearity of the deflection current. In the case of a horizontal scan generator a much shorter time is available for retrace and hence the deflection coil circuit cannot have too large a time constant and still function properly with a linear sawtooth signal to the input 62 of the amplifier. Accordingly, in a horizontal scan generator the horizontal deflection coil 16 is a low inductance coil having minimum distributed capacity, such as a printed circuit yoke, or the like, in which case the coil 16 will preferably have an inductance value less than 1 millihenry so that a linear deflection is obtained in response to a linear input signal applied to the input 62 of the amplifier 34.

The circuit shown in FIG. 2 can also be used in conjunction with a separate horizontal scan generator as a horizontal sweep skew and centering control circuit which is employed to introduce a vertical sawtooth component, which is differential in nature and variable in height, into the horizontal deflection coil while also providing for horizontal centering adjustments. In such an arrangement the circuit 78 is retained as it is, but the lower end of the potentiometer 22 is connected to a positive source of potential 94 so as to provide both positive and negative skew adjustment. Conventional coupling means are then provided for supplying a horizontal sweep sawtooth current from a suitable horizontal scan generator (not shown) to the deflection coil 16 which now acts as the horizontal deflection coil. For example, the deflection coil 16 can be connected by a capacitor 90 to one terminal of a horizontal scan output transformer the other terminal of which is grounded, and an inductor 92 can be inserted between the driver amplifier 72 and the deflection coil 16 to prevent the low impedance of the driver amplifier 72 from shunting the horizontal sawtooth past the deflection coil 16. The resistor 38 can then be bypassed by a capacitor 96 to prevent horizontal sweep components from entering the differential amplifier 34. The control 22 now functions as a horizontal skew control, and the control 70 now adjusts the horizontal centering.

The use of direct current, high-gain amplifiers in the present invention eliminates the need for direct current blocking capacitors which can distort the waveforms and which also make it impossible to adjust centering in the simple manner shown.

Any suitable type of high gain, differential amplifiers can be used in constructing the present invention. The amplifiers should have a high gain so as to minimize distortion, and differential inputs to cancel common mode signals. The driver amplifier 72 can be replaced by any equivalent amplifier that is capable of driving the necessary currents through the deflection coil 16, and can even be incorporated into the differential amplifier 34.

An important feature of the present invention is that both size and centering adjustments are accomplished with direct current or DC-signals. The size signal is obtained from the slider of a potentiometer 22 that is connected between ground and a negative bias potential. The centering signal is obtained from the slider of a potentiometer 70 which is connected between negative and positive bias potentials. These potentiometers or their equivalents can be located at any distance from the sweep circuit, since they handle only direct current signals which cannot be degraded by transmission through long cables. Any hum or noise which is picked up by the cables can be easily filtered out with conventional low pass filters. Hence, the sweep circuit of the present invention is ideally suited for use in remote control systems where sweep size and centering is adjusted at some distance from where the sweep is generated, such as in television studio systems.

What is claimed as new and desired to be secured by Letters Patent of the United States is:

1. A sweep generator for producing a sweep current in a deflection coil having two terminals comprising:
- a generator for producing a voltage whose amplitude at any moment is proportional to the desired sweep current amplitude;
- a differential amplifier having inverting and noninverting inputs and an output;
- first circuit means coupling the noninverting input of said differential amplifier to said voltage;
- second circuit means comprising a driver amplifier having a low impedance output connecting to one terminal of the deflection coil and having an input connected to the output of said differential amplifier;
- a resistive element connecting the other terminal of the deflection coil to a fixed potential point;
- and third circuit means connecting the inverting input of the differential amplifier to the node that is common to both the deflection coil and to the resistive element.

2. A sweep generator in accordance with claim 1 wherein a DC centering current is fed into one of the inputs of the differential amplifier from a remotely located centering control.

3. A sweep generator in accordance with claim 2, wherein the third circuit means comprises a resistive element, and wherein the centering current flows from the center tap of a potentiometer, through a resistive element, and into the inverting input of the differential amplifier.

4. A sweep generator in accordance with claim 1 wherein the driver amplifier comprises a pair of complementary transistors having their emitters connected to the deflection coil, their collectors connected to sources of opposite polarity potential, and their bases connected by biasing diodes to the output of the differential amplifier.

5. A sweep generator in accordance with claim 1 wherein the first circuit means comprises a resistive voltage divider network.

6. A sweep generator for producing a linear sawtooth sweep signal and further including a voltage to current converter for connecting said sweep signal to a load said sweep generator and converter comprising:
- an operational amplifier having an inverting input and an output, said sweep signal appearing at said output;
- an integrating capacitor connecting said input to said output;
- switching means connected in parallel with said integrating capacitor for discharging said capacitor in response to a periodic drive signal;
- size-determining current-generating means for supplying a direct current to the input of said operational amplifier, and including current adjustment means whereby said direct current can be manually varied in amplitude so as to adjust the magnitude of the sweep signal;
- a differential amplifier having inverting and noninverting inputs and an output;
- first direct current circuit means connecting the output of said operational amplifier to the noninverting input of the differential amplifier;
- second circuit means connecting the output of the differential amplifier to the load;
- a resistive element connected in series with the load; and
- third circuit means connecting the potential across said resistive element to the inverting input of the differential amplifier.

7. A sweep generator in accordance with claim 6 wherein the size-determining current-generating means comprises a potentiometer having a movable tap that is connected to the inverting input of the operational amplifier by a resistive element.

8. A sweep generator for producing a linear sawtooth sweep signal comprising:
- an operational amplifier having an inverting input and an output, said sweep signal appearing at said output;
- an integrating capacitor connecting said input to said output;
- switching means connected in parallel with said integrating capacitor for discharging said capacitor in response to a periodic drive signal;
- size-determining current-generating means for supplying a direct current to the input of said operational amplifier, and including current adjustment means whereby said direct current can be manually varied in amplitude so as to adjust the magnitude of the sweep signal, said size-determining current-generating means comprising a potentiometer having a movable tap that is connected to the inverting input of the operational amplifier by a resistive element;
- a noninverting input that is connected by a resistive circuit network to both the potentiometer movable tap and also to a reference source of potential, whereby changes in centering caused by adjustment of the potentiometer are minimized.

9. A sweep generator for producing a linear sawtooth within a deflection coil comprising:
- an integrator including an integrating capacitor having an input and an output;
- size-adjustment current-generating means including a manual current adjust control for generating a current that is supplied to the input of the integrator;
- capacitor discharge means connected across said integrating capacitor for discharging said capacitor periodically in response to a periodic drive signal;

current sensing means for producing a voltage proportional to the magnitude of the current in said deflection coil;

a differential amplifier for determining the difference between the voltage produced by said current-sensing means and the voltage at the output of the integrator, and for applying a voltage proportional to this difference to the deflection coil; and means for adding a voltage proportional to the size adjustment current to the voltages being processed by the differential amplifier, so that adjustment of the size current does not alter the centering of the sweep.

10. A sweep generator in accordance with claim 9 and further including means for generating a manually adjustable centering voltage and means for adding this voltage to those being processed by the differential amplifier.

11. A sweep generator for producing a linear sawtooth sweep in a deflection coil comprising:

an operational amplifier having inverting and noninverting inputs;

an integrating capacitor connected between the inverting input and the output of said operational amplifier;

a size potentiometer connected between fixed potential sources having a slider connected to the inputs of said operational amplifier by resistive circuits;

a resistive circuit path connecting the noninverting input of the operational amplifier to ground;

a field effect transistor connected in parallel with said integrating capacitor, and including a gate that is connected to the output of said operational amplifier by a resistive circuit path;

normally conductive switching means connecting the gate of said field effect transistor to a potential source, said switching means being rendered nonconductive by periodic drive pulses;

a differential amplifier having an output connected to one side of the deflection coil, an inverting input connected to the other side of the deflection coil, and a noninverting input connected to the operational amplifier output;

resistive means connecting said other side of the deflection coil to ground; and a centering potentiometer connected between fixed potential points and having a movable tap connected by a resistive circuit path to an input of said differential amplifier.

12. A horizontal sweep skew adjustment circuit comprising:

an integrator having an input and an output, and including an integrating capacitor;

discharge means for periodically discharging said integrating capacitor during each vertical retrace period;

manually adjustable skew current means for providing a manually adjustable current to the input of said integrator;

horizontal sweep signal generating means;

a deflection coil;

high frequency coupling means connecting the horizontal sweep signal generating means to the deflection coil;

a differential amplifier having an inverting and a noninverting input and having an output;

low frequency coupling means connecting the output of said differential amplifier to said deflection coil;

first circuit means coupling the output of said integrator to the noninverting input of said differential amplifier;

a resistive element connected in series with said deflection coil; and second circuit means for transferring the potential which appears across said resistive element to the inverting input of said differential amplifier.

13. A horizontal skew adjustment circuit in accordance with claim 12, wherein means are provided for adding to the differential amplifier input signals a potential proportional to the manually adjustable skew current.

14. A horizontal skew adjustment circuit in accordance with claim 12 to which has been added means for generating a manually adjustable centering signal, and means for adding this signal to the differential amplifier input signals.

* * * * *